(12) United States Patent
Vogt

(10) Patent No.: US 8,348,214 B2
(45) Date of Patent: Jan. 8, 2013

(54) MOUNTING ARRANGEMENT FOR OPTICAL DEVICES

(76) Inventor: Philippe Vogt, Besancon Cedex (FR)

( * ) Notice: Subject to any disclaimer, the term of this patent is extended or adjusted under 35 U.S.C. 154(b) by 266 days.

(21) Appl. No.: 12/669,531

(22) PCT Filed: Jul. 25, 2008

(86) PCT No.: PCT/EP2008/059794
§ 371 (c)(1),
(2), (4) Date: Jan. 18, 2010

(87) PCT Pub. No.: WO2009/016116
PCT Pub. Date: Feb. 5, 2009

(65) Prior Publication Data
US 2010/0181454 A1    Jul. 22, 2010

(30) Foreign Application Priority Data
Jul. 28, 2007   (DE) .......................... 10 2007 035 562

(51) Int. Cl.
*A47G 1/10* (2006.01)
(52) U.S. Cl. ............. 248/316.4; 248/187.1; 248/224.61; 396/428
(58) Field of Classification Search ............... 248/187.1, 248/176.3, 177.1, 309.1, 316.1, 316.4, 316.8, 248/346.3, 224.61, 689; 396/428, 419, 425; 359/489.2, 490.03
See application file for complete search history.

(56) References Cited

U.S. PATENT DOCUMENTS

| | | | |
|---|---|---|---|
| 2,840,334 A | | 6/1958 | Cauthen |
| 3,006,052 A | * | 10/1961 | Stickney et al. ............ 248/187.1 |
| 3,612,462 A | * | 10/1971 | Mooney et al. ............ 248/316.4 |
| 3,737,130 A | | 6/1973 | Shiraishi |
| 4,752,794 A | | 6/1988 | Bohannon |
| 5,074,662 A | * | 12/1991 | Sullivan ........................ 356/244 |

(Continued)

FOREIGN PATENT DOCUMENTS

DE          29613027 U1    11/1996
(Continued)

OTHER PUBLICATIONS

International Search Report and Written Opinion of the International Searching Authority from corresponding Patent Cooperation Treaty (PCT) Application No. PCT/EP2008/059794, mailed Oct. 2, 2008.

(Continued)

*Primary Examiner* — Tan Le
(74) *Attorney, Agent, or Firm* — Gardner, Linn, Burkhart & Flory, LLP

(57) ABSTRACT

The invention relates to a mounting arrangement for optical devices having a mounting plate forming an undercut guide for receiving a clamping plate, the mounting plate comprising a side bar in which an undercut profile groove is formed, and having a strip located opposite the bar movably connected to the mounting plate via a clamping mechanism and a second undercut profile groove forming the undercut guide together with the first undercut profile groove, the strip being able to be tightened against the mounting plate by the clamping mechanism to fix the clamping plate, whereby the spacing distance between the undercut profile grooves is reduced. A second undercut guide is formed by additional undercut profile grooves in the same side bar of the mounting plate and the same strip, wherein the guides are both disposed on one side of the plane (X) spanned by the mounting plate.

21 Claims, 2 Drawing Sheets

U.S. PATENT DOCUMENTS

| | | | |
|---|---|---|---|
| 5,322,251 | A | 6/1994 | Schumer et al. |
| 5,737,657 | A | 4/1998 | Paddock et al. |
| 5,870,641 | A | 2/1999 | Chrosziel |
| 6,042,277 | A | 3/2000 | Errington |
| 6,435,738 | B1 | 8/2002 | Vogt |
| 6,663,299 | B1 | 12/2003 | Shupak |
| 6,773,172 | B1 | 8/2004 | Johnson et al. |
| 6,827,319 | B2 | 12/2004 | Mayr |
| 6,988,846 | B2 | 1/2006 | Vogt |
| 7,185,862 | B1 * | 3/2007 | Yang .......................... 248/187.1 |
| D591,325 | S * | 4/2009 | Dordick ....................... D16/242 |
| 7,588,376 | B2 * | 9/2009 | Friedrich ..................... 396/419 |
| 7,823,316 | B2 * | 11/2010 | Storch et al. ..................... 42/90 |
| 8,075,203 | B2 * | 12/2011 | Johnson ........................ 396/428 |
| 2003/0194268 | A1 | 10/2003 | Vogt |
| 2005/0041966 | A1 | 2/2005 | Johnson |
| 2006/0177215 | A1 | 8/2006 | Johnson |
| 2010/0181454 | A1 * | 7/2010 | Vogt ........................... 248/309.1 |

FOREIGN PATENT DOCUMENTS

| | | |
|---|---|---|
| DE | 202 03 018 U1 | 5/2002 |
| DE | 103 29 224 B3 | 10/2005 |
| EP | 0323550 A1 | 7/1989 |
| EP | 1160499 A1 | 12/2001 |
| EP | 1365187 A1 | 11/2003 |
| EP | 0982613 B1 | 1/2004 |
| EP | 1893906 B1 | 8/2008 |
| WO | WO 2008028351 A1 | 3/2008 |

OTHER PUBLICATIONS

English translation of First Chinese Office Action dated Dec. 31, 2010, of corresponding Chinese Patent Application No. 2008800231723.

English translation of Second Chinese Office Action dated Aug. 4, 2011, of corresponding Chinese Patent Application No. 2008800231723.

International Preliminary Report on Patentability from corresponding Patent Cooperation Treaty Patent Application No. PCT/EP2008/05974 mailed Mar. 4, 2010.

English translation of Third Chinese Office Action report dated Mar. 14, 2012 of corresponding Chinese Patent Application No. 2008800231723.

English translation of claims submitted in granted corresponding EPO application EP 08786454.2.

European Patent Office Decision to Grant a Patent in corresponding EPO application EP 08786454.2.

* cited by examiner

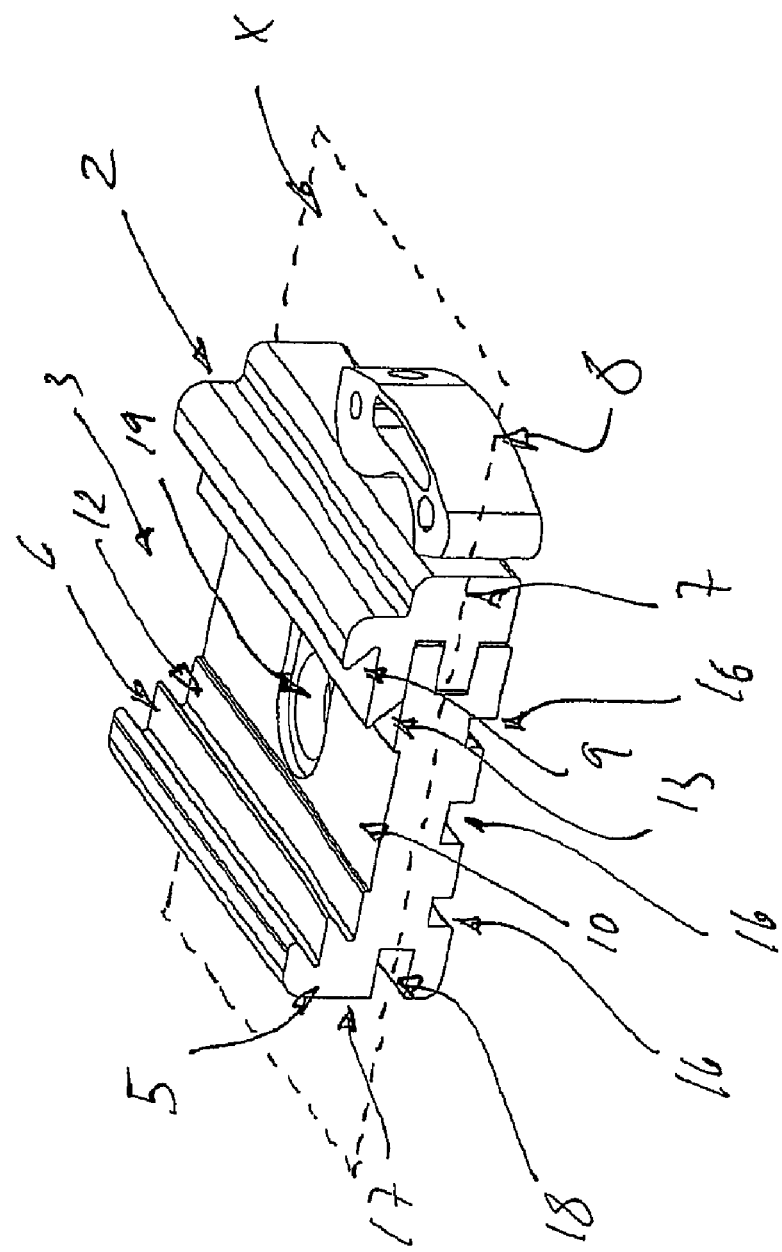

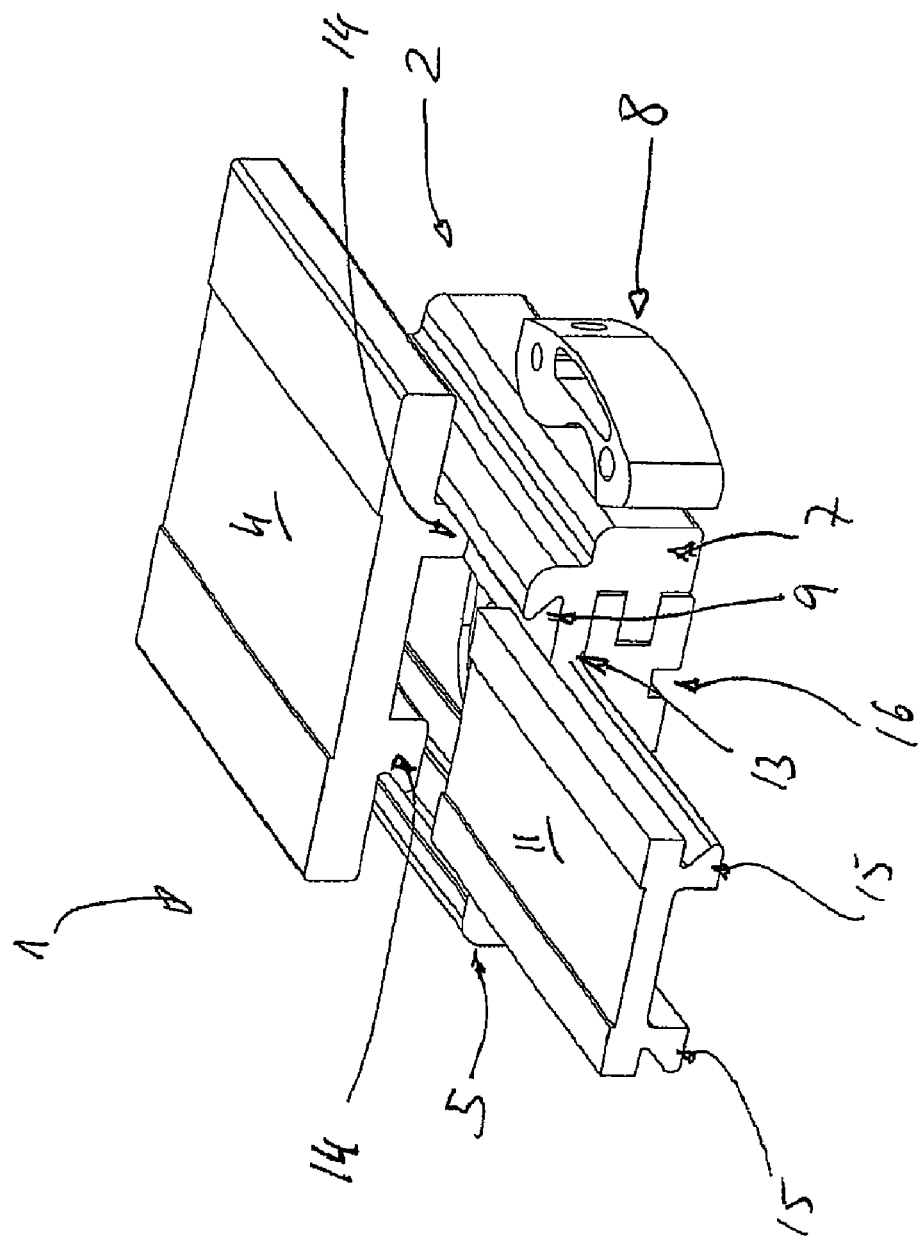

MOUNTING ARRANGEMENT FOR OPTICAL DEVICES

The invention relates to a mounting arrangement for optical devices and, in particular, to a mounting arrangement having a mounting plate which forms an undercut guide in order to receive a clamping plate, wherein the mounting plate has a lateral web, in which an undercut profiled groove is formed, and having a strip opposite the web, which is moveably connected to the mounting plate by a clamping mechanism and has a second undercut profiled groove which, together with the first undercut profiled groove, forms the undercut guide, wherein the strip for fixing the clamping plate can be pulled against the mounting plate by the clamping mechanism, whereby the spacing between the undercut profiled grooves is reduced.

Such mounting arrangements are known for rapidly changing optical devices on stands, which permit non-screwed connection of the optical device to the stand, etc. These mounting devices, also known as quick-change adaptor systems, offer a quick-change facility in association with a very high level of reliability.

They conventionally include a damping plate for mounting on the optical device and a mounting plate which is mounted on the stand, etc., and which receives the clamping plate so as to fix it in a releasable manner, for which purpose this clamping plate can be mounted in a clamping manner on the mounting plate via a clamping mechanism.

U.S. Pat. No. 6,988,846 B2 issued to the present inventor discloses a mounting arrangement of this type for optical devices, in which a mounting plate forms a dovetail guide to receive a clamping plate. For this purpose, the mounting plate includes a lateral dovetail profiled groove formed therein. The opposite-lying second dovetail profiled groove is moveably connected to the mounting plate via a clamping mechanism so that it can pull the dovetail profiled groove against the mounting plate. For attachment purposes, the clamping plate is inserted into the dovetail profiled grooves and the second dovetail profiled groove is pulled against the mounting plate by the clamping mechanism so that the clamping plate is fixed in the dovetail guide.

Although, over the years, this mechanism has proved to be reliable and convenient to handle, such mounting arrangements are relatively heavy and the mounting arrangement additionally lacks flexibility with respect to different clamping plates since these must be precisely matched to the dovetail guide. The clamping plates must, therefore, also be adapted to the respective optical device.

From DE 103 29 224 B3, an alignment apparatus for an optical device is known, which is provided, as an auxiliary device, with a mechanical receiver and can thereby be fixedly connected to the optical device, wherein the alignment apparatus has a distance-measuring unit for determining the spacing with respect to an object using means for determining at least two spacing measurements between the alignment apparatus and the object along at least two different measuring axes and two independent display units for displaying the spacing measurements. Apart from the lower receiver, the apparatus has a further upper receiver, these being disposed on opposite sides of the plate. The receivers are formed as undercut profiled grooves.

SUMMARY OF THE INVENTION

The present invention creates a mounting arrangement which is of lower weight than the known arrangements and is also more flexible for receiving different clamping plates. The good handling capability and high level of reliability are retained.

A mounting arrangement for optical devices, according to an aspect of the invention, includes a mounting plate which forms an undercut guide in order to receive a damping plate. The mounting plate has a lateral web, in which an undercut profiled groove is formed, and has a strip opposite the web. The strip is moveably connected to the mounting plate by a clamping mechanism and has a second undercut profiled groove which, together with the first undercut profiled groove, forms the undercut guide. In this manner, the strip for fixing the clamping plate can be pulled against the mounting plate by the clamping mechanism, whereby the spacing between the undercut profiled grooves is reduced. A second undercut guide is formed by further undercut profiled grooves in the same lateral web of the mounting plate and the same strip. The guides are both disposed on one side of a plane spanned by the mounting plate.

Owing to the fact that a second undercut guide is formed by further undercut profiled grooves in the same lateral web of the mounting plate and the same strip, wherein the guides are both disposed on one side of a plane spanned by the mounting plate, it may be possible—independently of the formation of the first guide—to form a second different guide for, e.g., smaller optical devices and additionally to save weight by the introduction of the second guide, so that the arrangement becomes lighter. In so doing, the proven clamping system is retained so that the reliability remains assured and compatibility with earlier systems is achieved.

In addition, two different or possibly identical clamping plates can also be mounted at the same time. This permits more flexible use, e.g., for extension purposes, etc.

The weight saving is not insignificant in that the optical devices are essentially heavy professional photographic cameras and studio cameras which are very heavy in themselves, so that a weight saving improves the necessary precise handling over the course of a number of hours every day.

Therefore, larger devices with a correspondingly large clamping plate can be mounted in one of the undercut guides and smaller optical devices with a correspondingly small clamping plate can be mounted in the other undercut guide. Thus, both smaller and also larger optical devices can be used by employing the same quick-change system without a separate mounting plate being necessary. Therefore, apart from the associated weight saving, the mounting arrangement also becomes more flexible.

The undercut profiled grooves of the second undercut guide may be disposed nested with the undercut profiled grooves of the first undercut guide in the direction of the mounting plate, i.e., the guides lie "one above the other" when seen in the cross-section of the arrangement. The spacing may be large enough that two clamping plates can be received at the same time.

The spacing between the undercut profiled grooves of the second undercut guide may be smaller than the spacing between the undercut profiled grooves of the first undercut guide, i.e., the smaller guide lies "at the bottom" so that this is particularly suitable for receiving smaller clamping plates.

The undercut guide may be a dovetail guide and the undercut profiled grooves may be dovetail profiled grooves. These permit the clamping plates to be fixed well and reliably since—when the profiled grooves are pulled together—they simultaneously laterally clamp the clamping plates and press them downwards onto the mounting plate.

In order to further save weight, a provision may be made that the mounting plate has at least one groove in the underside. Furthermore, in addition, a groove can be provided in the outside of the lateral web.

Furthermore, the mounting plate can have one or a plurality of through-going bores in the region between the profiled grooves. In addition to connection to the stand, etc., these can also serve as bores to save weight.

The respective clamping plate has downwardly directed, spaced-apart tongues which are formed for engagement into the undercut profiled grooves. Between these tongues the clamping plate is hollowed out so that on the one hand a screw connection, etc., to the optical device is possible from below through the plate, and in addition, a weight saving can be achieved while still providing a high level of stability.

By forming the mounting arrangement, in these ways, it is possible, despite the small construction size of the arrangement as a whole, to achieve a considerable weight saving. Thus, about 50 g can be saved.

BRIEF DESCRIPTION OF THE DRAWINGS

Further details, features and advantages of the invention are given in the following description of an exemplified embodiment with the aid of the drawing in which:

FIG. 1 shows a schematic perspective view of a mounting plate of the invention; and FIG. 2 shows a schematic perspective view of the mounting plate of FIG. 1 with partially inserted clamping plates.

DESCRIPTION OF THE PREFERRED EMBODIMENT

Referring now to the drawing and the illustrative embodiments depicted therein, a mounting arrangement, designated as a whole by 1, for optical devices is shown. The mounting arrangement 1 has a mounting plate 2 which has a first dovetail-like undercut guide 3 to receive a large clamping plate 4 (see FIG. 2 in which it is partially inserted from the rear in the viewing direction).

The mounting plate 2 may be substantially of rectangular plate-shaped form and spans a plane X which passes through it. The mounting plate 2 has a lateral web 5, in which an undercut dovetail profiled groove 6 is formed, which forms one side of the guide 3. On the opposite side of the mounting plate 2, a strip 7 is provided which is moveably connected to the mounting plate 2 via a clamping mechanism 8 and forms a second undercut dovetail profiled groove 9 of the guide 3.

The dovetail profiled grooves 6 and 9 thus together form the first undercut guide 3 which lies on one side of the plane X.

The strip 7 can be pulled against the mounting plate 2 by the clamping mechanism 8 in order to fix the clamping plate 4, whereby the spacing between the undercut profiled grooves 6 and 9 is reduced so that the mounting plate 2 lying between them is fixedly clamped.

Referring to FIG. 2, the mounting plate 2 also has a second dovetail-like undercut guide 10 in order to receive a small clamping plate 11 inserted from the front as viewed in FIG. 2. It will be noted that both clamping plates 4 and 11 can possibly be received at the same time. To this end, undercut profiled grooves 12 and 13 are provided which, analogously to the profiled grooves 6 and 9, are formed in the lateral web 5 and strip 7, respectively.

The undercut profiled grooves 12 and 13 of the second undercut guide 10 are disposed behind the undercut profiled grooves 6, 9 of the first undercut guide 3 in the direction of the mounting plate 2, i.e., below or nested therein. Both guides 3, 10 thus lie on one side of the plane X. The spacing between the undercut profiled grooves 12, 13 of the second undercut guide 10 is smaller than the spacing between the undercut profiled grooves 6, 9 of the first undercut guide 3.

The clamping plates 4 and 11, respectively, have—on the underside—downwardly directed, spaced-apart tongues 14, 15 which are formed for engagement in the respective undercut profiled grooves. The intermediate space between the tongues is hollowed out so that further weight is saved.

In the underside, the mounting plate 2 has three grooves 16. The outside 17 of the lateral web has one groove 18 for further weight saving. At the same time, this serves to prevent skewing when the mounting arrangement is received in corresponding adjustment devices.

Furthermore, the mounting plate 2 has a through-going bore 19 in the region between the profiled grooves, which serves for mounting on an adjusting device, such as, e.g., a ball head of a stand.

Changes and modifications in the specifically described embodiments can be carried out without departing from the principles of the invention which is intended to be limited only by the scope of the appended claims, as interpreted according to the principles of patent law including the doctrine of equivalents.

REFERENCE LIST 1 mounting arrangement
2 mounting plate
3 guide
4 clamping plate
5 web
6 profiled groove
7 strip
8 clamping mechanism
9 profiled groove
10 guide
11 clamping plate
12 profiled groove
13 profiled groove
14 tongue
15 tongue
16 groove
17 outside
18 groove
19 bore
X plane

The invention claimed is:

1. Mounting arrangement for mounting optical devices, comprising:
   a mounting plate which forms first undercut guide in order to receive a clamping plate, wherein the mounting plate has a lateral web, in which a first undercut profiled groove is formed, and having a strip opposite the web, said strip being moveably connected to the mounting plate by a clamping mechanism and having a second undercut profiled groove which, together with the first undercut profiled groove, forms the first undercut guide, wherein the strip can be pulled against the mounting plate by the clamping mechanism for fixing the clamping plate, whereby the spacing between the first and second undercut profiled grooves is reduced; and
   wherein a second undercut guide for receiving a second clamping plate is formed by a third undercut profiled groove in the same lateral web of the mounting plate and a fourth undercut profiled groove in the same strip, wherein the strip can be pulled against the mounting plate by the clamping mechanism for fixing the second clamping plate, whereby the space between the third and fourth undercut profiled grooves is reduced, and wherein the first undercut guide and the second undercut guide are both disposed on one side of the mounting plate relative to a mounting plane defined by the mounting plate.

2. Mounting arrangement as claimed in claim 1, wherein the third and fourth undercut profiled grooves of the second undercut guide are disposed inwardly and vertically lower than the first and second undercut profiled grooves of the first undercut guide in the direction of the mounting plate.

3. Mounting arrangement as claimed in claim 2, wherein the spacing between the undercut profiled grooves of the second undercut guide is smaller than the spacing between the undercut profiled grooves of the first undercut guide.

4. Mounting arrangement as claimed in claim 3, wherein the undercut guides are dovetail guides and the undercut profiled grooves are dovetail profiled grooves.

5. Mounting arrangement as claimed in claim 4, wherein the mounting plate has at least one groove in the underside.

6. Mounting arrangement as claimed in claim 5, wherein the mounting plate has a groove in the outside of the lateral web.

7. Mounting arrangement as claimed in claim 6, wherein the mounting plate has a through-going bore in the region between the profiled grooves.

8. Mounting arrangement as claimed in claim 7, wherein the clamping plate has downwardly directed, spaced-apart tongues which are formed for engagement into the undercut profiled grooves.

9. Mounting arrangement as claimed in claim 5, wherein the at least one groove hi the underside comprises three grooves in the underside.

10. Mounting arrangement as claimed in claim 1, wherein the undercut guides are dovetail guides and the undercut profiled grooves are dovetail profiled grooves.

11. Mounting arrangement as claimed in claim 1, wherein the mounting plate has at least one groove in the underside.

12. Mounting arrangement as claimed in claim 11, wherein the at least one groove in the underside comprises three grooves in the underside.

13. Mounting arrangement as claimed in claim 1, wherein the mounting plate has a groove in the outside of the lateral web.

14. Mounting arrangement as claimed in claim 1, wherein the mounting plate has a through-going bore in the region between the profiled grooves.

15. Mounting arrangement as claimed in claim 1, wherein the clamping plate has downwardly directed, spaced-apart tongues which are formed for engagement into the undercut profiled grooves.

16. Mounting arrangement as claimed in claim 2, wherein the undercut guides are dovetail guides and the undercut profiled grooves are dovetail profiled grooves.

17. Mounting arrangement as claimed in claim 2, wherein the mounting plate has at least one groove in the underside.

18. Mounting arrangement as claimed in claim 17, wherein the at least one groove in the underside comprises three grooves in the underside.

19. Mounting arrangement as claimed in claim 2, wherein the mounting plate has a groove in the outside of the lateral web.

20. Mounting arrangement as claimed in claim 2, wherein the mounting plate has a through-going bore in the region between the profiled grooves.

21. Mounting arrangement as claimed in claim 2, wherein the clamping plate has downwardly directed, spaced-apart tongues which are formed for engagement into the undercut profiled grooves.

* * * * *

UNITED STATES PATENT AND TRADEMARK OFFICE
CERTIFICATE OF CORRECTION

PATENT NO. : 8,348,214 B2
APPLICATION NO. : 12/669531
DATED : January 8, 2013
INVENTOR(S) : Philippe Vogt It is certified that error appears in the above-identified patent and that said Letters Patent is hereby corrected as shown below:

Column 1
Line 23, "damping" should be --clamping--

Column 2
Line 6, "damping" should be --clamping--
Lines 18/19, "plane spanned" should be --plane (X) spanned--

Column 4
Line 53, Claim 1, "forms first" should be --forms a first--

Column 5
Line 35, Claim 9, "hi" should be --in--

Signed and Sealed this
Ninth Day of April, 2013

Teresa Stanek Rea
*Acting Director of the United States Patent and Trademark Office*